(12) United States Patent
Namiki

(10) Patent No.: US 11,511,645 B2
(45) Date of Patent: Nov. 29, 2022

(54) DISPLAY DEVICE, DISPLAY METHOD, AND PROGRAM FOR CONTROLLING A CHARACTER BASED ON BATTERY STATE

(71) Applicant: HONDA MOTOR CO., LTD., Tokyo (JP)

(72) Inventor: Shigeru Namiki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 292 days.

(21) Appl. No.: 16/871,090

(22) Filed: May 11, 2020

(65) Prior Publication Data

US 2020/0384885 A1    Dec. 10, 2020

(30) Foreign Application Priority Data

May 21, 2019    (JP) .............................. JP2019-095170

(51) Int. Cl.
*B60L 58/12*    (2019.01)
*B60K 35/00*    (2006.01)

(52) U.S. Cl.
CPC .............. *B60L 58/12* (2019.02); *B60K 35/00* (2013.01); *B60K 2370/171* (2019.05); *B60K 2370/52* (2019.05)

(58) Field of Classification Search
CPC ... B60L 58/12; B60K 35/00; B60K 2370/171; B60K 2370/52
See application file for complete search history.

(56) References Cited

U.S. PATENT DOCUMENTS

| 9,684,430 | B1* | 6/2017 | Perigault | ............... G06F 3/0237 |
| 10,611,247 | B1* | 4/2020 | Breen | ................... H02J 7/1423 |
| 2003/0060937 | A1* | 3/2003 | Shinada | ............. G01C 21/3641 701/1 |
| 2006/0166708 | A1* | 7/2006 | Kim | ................... H04M 1/72427 455/566 |
| 2011/0043355 | A1* | 2/2011 | Chander | ................ B60K 15/05 320/109 |
| 2011/0298808 | A1* | 12/2011 | Rovik | .................... B60K 35/00 345/473 |
| 2015/0360578 | A1* | 12/2015 | Duan | ...................... B60L 58/12 340/455 |

(Continued)

FOREIGN PATENT DOCUMENTS

| JP | 10-068786 | 3/1998 |
| JP | 2000-307689 | 11/2000 |
| JP | 2003-009404 | 1/2003 |

(Continued)

OTHER PUBLICATIONS

Japanese Office Action for Japanese Patent Application No. 2019-095170 dated Mar. 1, 2022.

*Primary Examiner* — Beau D Spratt
(74) *Attorney, Agent, or Firm* — Amin, Turocy & Watson, LLP

(57) ABSTRACT

A display device includes: an acquisition unit configured to acquire information on a use status of a battery that stores electric power for traveling of a vehicle; a display unit configured to display an image; and a display control unit configured to cause the display unit to display an image in which a state of the battery is represented by an anthropomorphic character based on an acquisition result of the acquisition unit.

8 Claims, 11 Drawing Sheets

(56) References Cited

U.S. PATENT DOCUMENTS

2018/0034114 A1* 2/2018 Hinterberger ....... H01M 10/482
2020/0353839 A1* 11/2020 Tarchinski .............. B60L 58/12

FOREIGN PATENT DOCUMENTS

| JP | 2003-189491 | 7/2003 |
| JP | 2004-170231 | 6/2004 |
| JP | 2009-208484 | 9/2009 |
| JP | 2013-032132 | 2/2013 |
| JP | 2019-105595 | 6/2019 |

* cited by examiner

| SENSING RESULT | NORMAL | WARNING | ABNORMAL |
|---|---|---|---|
| ANTHROPOMORPHIC DISPLAY | ON | OFF | OFF |
| DISPLAY IMAGE | ON | (YELLOW) | (RED) |

| PRODUCT NAME | SERIAL NUMBER | ANTHROPOMORPHIC DISPLAY | STANDARD CHARACTER | ... |
|---|---|---|---|---|
| V001-XXX | SJFO9hE | POSSIBLE | CHARACTER 1 | ... |

| MEASUREMENT TIME | CHARGING RATE | CHARGING AND DISCHARGING CURRENT |
|---|---|---|
| 2018/MM/DD 15:00 | 70% | X1 |
| 2018/MM/DD 15:01 | 68% | X2 |
| ⋮ | ⋮ | ⋮ |
| 2018/MM/DD 15:59 | 22% | X60 |
| 2018/MM/DD 16:00 | 20% | X61 |
| 2018/MM/DD 16:01 | 21% | X62 |
| ⋮ | ⋮ | ⋮ |

FIG. 6
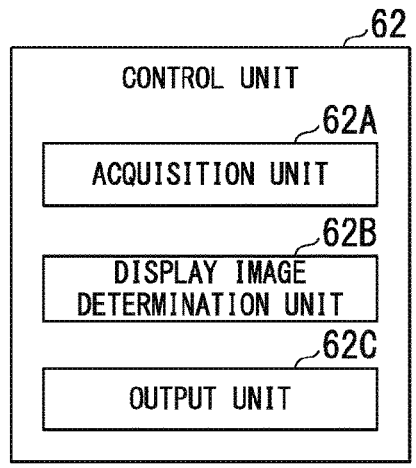
FIG. 7
| DETERIORATION DEGREE | LOW | | | | ⇔ | | HIGH |
|---|---|---|---|---|---|---|---|
| ANTHROPOMORPHIC DISPLAY 1 | YOUNG AGE | | | ... | | | OLD AGE |
| ANTHROPOMORPHIC DISPLAY 2 | INFANT | CHILD | BOY | YOUTH | MIDDLE AGED PERSON | LATE MIDDLE AGED PERSON | AGED PERSON |
FIG. 8
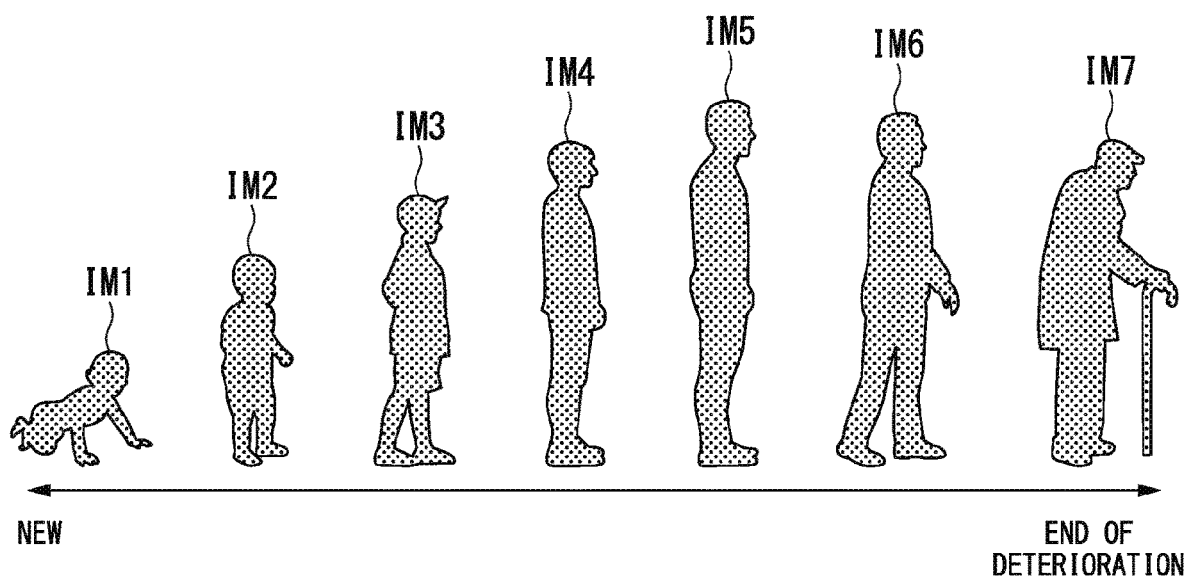
NEW → END OF DETERIORATION

| CHARGING RATE | HIGH | ⇔ | LOW |
|---|---|---|---|
| ANTHROPOMORPHIC DISPLAY 3 | SATISFIED | ... | DISSATISFIED |
| ANTHROPOMORPHIC DISPLAY 4 | FULL | ... | HUNGRY |
| ... | ... | ... | ... |

| FREQUENCY OF USE | TOO LOW | ⇔ | SUITABLE | ⇔ | EXCESSIVE |
|---|---|---|---|---|---|
| ANTHROPOMORPHIC DISPLAY 5 | LONELY | ⇔ | HAPPY | ⇔ | TIRED |
| ... | ... | ... | ... | ... | ... |

FIG. 13
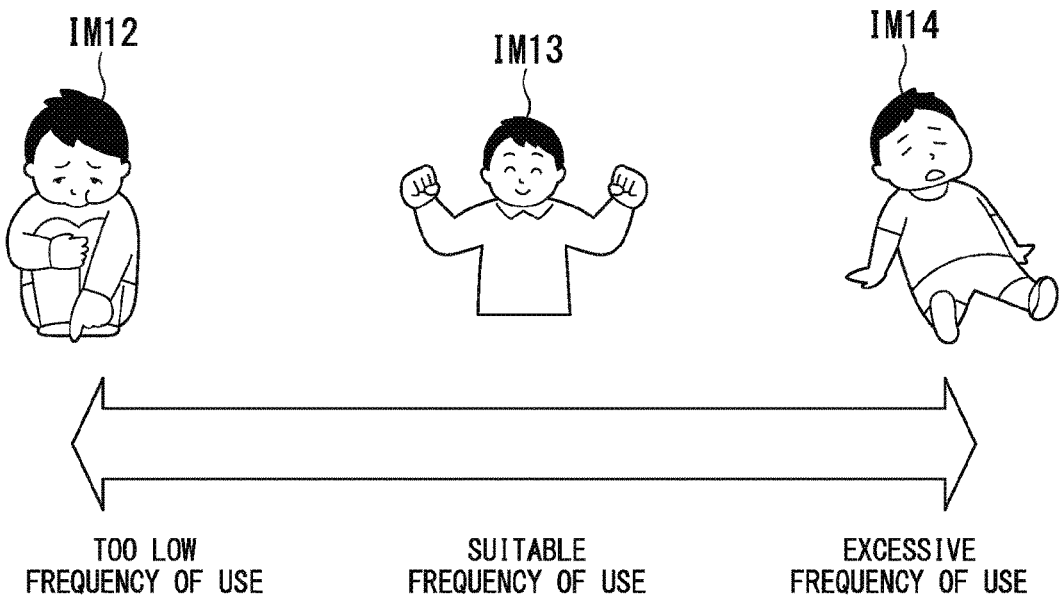
FIG. 14
| DETERIORATION EVALUATION | HIGH (DETERIORATION PROMOTED) | ⇔ | LOW (DETERIORATION CURBED) |
|---|---|---|---|
| ANTHROPOMORPHIC DISPLAY 6 | ANGRY | ... | JOY |
| ... | ... | ... | ... |
| ... | ... | ... | ... |
FIG. 15
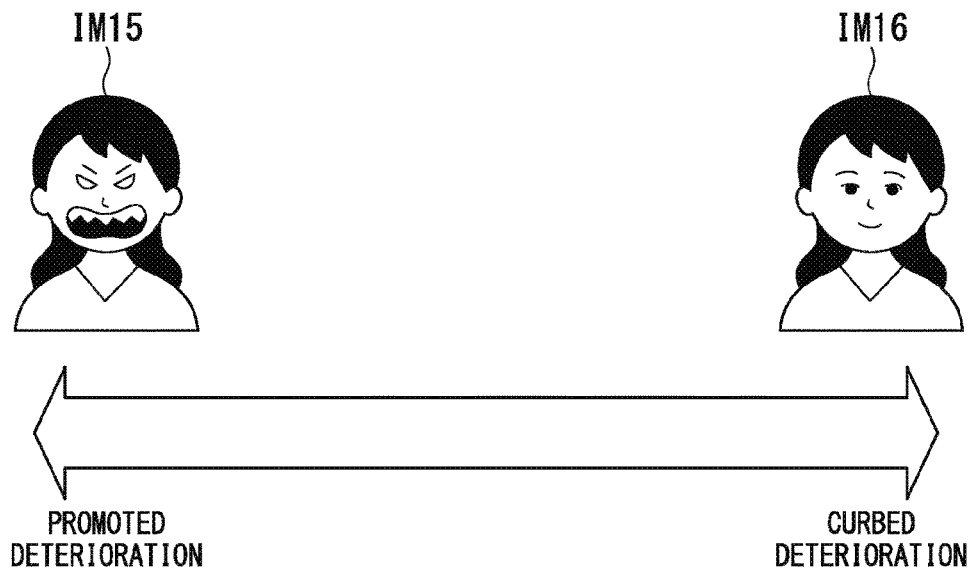

DISPLAY DEVICE, DISPLAY METHOD, AND PROGRAM FOR CONTROLLING A CHARACTER BASED ON BATTERY STATE

CROSS-REFERENCE TO RELATED APPLICATION

Priority is claimed on Japanese Patent Application No. 2019-095170, filed on May 21, 2019, the contents of which are incorporated herein by reference.

BACKGROUND

Field of the Invention

The present invention relates to a display device, a display method, and a program.

Background

Conventionally, a technology for displaying a remaining battery level and a deterioration state of a battery has been disclosed (for example, refer to Japanese Unexamined Patent Application, First Publication No. 2000-307689 and Japanese Unexamined Patent Application, First Publication No. 2004-170231).

SUMMARY

However, there is a possibility that a user cannot easily and intuitively understand a deterioration state of a battery in the related art.

Aspects of the present invention have an object that provides a display device, a display method, and a program that can display the deterioration state of a battery in a manner in which a user can easily and intuitively understand.

A first aspect of the present invention is a display device including: an acquisition unit configured to acquire information on a use status of a battery that stores electric power for traveling of a vehicle; a display unit configured to display an image; and a display control unit configured to cause the display unit to display an image in which a state of the battery is represented by an anthropomorphic character based on an acquisition result of the acquisition unit.

According to a second aspect of the present invention, in the display device according to the first aspect described above, the display control unit may cause the display unit to display an image in which a degree of deterioration of the battery is expressed using an age of the anthropomorphic character.

According to a third aspect of the present invention, in the display device according to the first or the second aspect described above, the display control unit may cause the display unit to display an image in which a charging rate of the battery is expressed using an emotion of the anthropomorphic character.

According to a fourth aspect of the present invention, in the display device according to any one of the first to the third aspects described above, the display control unit may cause the display unit to display an image of the anthropomorphic character that looks satisfied when a charging rate of the battery is equal to or more than a predetermined value, and cause the display unit to display an image of the anthropomorphic character that looks dissatisfied when the charging rate of the battery is less than the predetermined value.

According to a fifth aspect of the present invention, in the display device according to any one of the first to the fourth aspects described above, the display control unit may be configured to express a frequency of use of the battery using an emotion of an anthropomorphic character to be expressed, cause the display unit to display an image of the anthropomorphic character that looks happy when the frequency of use is suitable, cause the display unit to display an image of the anthropomorphic character that looks tired when the frequency of use is excessive, and cause the display unit to display an image of the anthropomorphic character that looks lonely when the frequency of use is too low.

According to a sixth aspect of the present invention, in the display device according to the first to the fifth aspects described above, the display control unit may be configured to express a progress of a deterioration state of the battery using an emotion of an anthropomorphic character to be expressed, cause the display unit to display an image of the anthropomorphic character representing an emotion of anger when it is determined that the deterioration of the battery is advanced, and cause the display unit to display an image of the anthropomorphic character representing an emotion of joy when it is determined that the deterioration of the battery is curbed.

A seventh aspect of the present invention is a display method including: by a computer, acquiring information on a use status of a battery that stores electric power for traveling of a vehicle; and by the computer, displaying an image in which a state of the battery is represented by an anthropomorphic character on a display unit based on a result of the acquisition.

An eighth aspect of the present invention is a computer-readable non-transitory storage medium that includes a program causing a computer to: acquire information on a use status of a battery that stores electric power for traveling of a vehicle; and display an image in which a state of the battery is represented by an anthropomorphic character on a display unit based on a result of the acquisition.

According to the first to the eighth aspects described above, it is possible to display a deterioration state of a battery in a manner in which a user can easily and intuitively understand.

According to the third and the fourth aspects described above, it is possible to display a charging rate of a battery in a manner in which a user can easily and intuitively understand.

According to the fifth aspect described above, it is possible to display information on a frequency of use of a battery in a manner in which a user can easily and intuitively understand.

BRIEF DESCRIPTION OF THE DRAWINGS

FIG. 3 is a diagram which shows an example of information stored in display settings.

FIG. 4 is a diagram which shows an example of information stored in battery information.

FIG. 5 is a diagram which shows an example of information stored in charging and discharging history.

FIG. 6 is a diagram which shows an example of a configuration of a control unit.

FIG. 7 is a diagram which shows an example of a rule for determining an image indicating a degree of deterioration of a battery by a display image determination unit.

FIG. 8 is a diagram which shows an example of an image set of an "anthropomorphic display 2."

FIG. 13 is a diagram which shows an example of determining the image indicating a frequency of use of the battery by the display image determination unit.

FIG. 14 is a diagram which shows an example of a rule for determining an image indicating a progress in a deterioration state of the battery by the display image determination unit.

FIG. 15 is a diagram which shows an example of determining an image indicating a result of deterioration evaluation of the battery by the display image determination unit.

DESCRIPTION OF EMBODIMENTS

Hereinafter, embodiments of a display device, a display method, and a program according to the present invention will be described with reference to the drawings.

[Overall Configuration]

Figure 1:
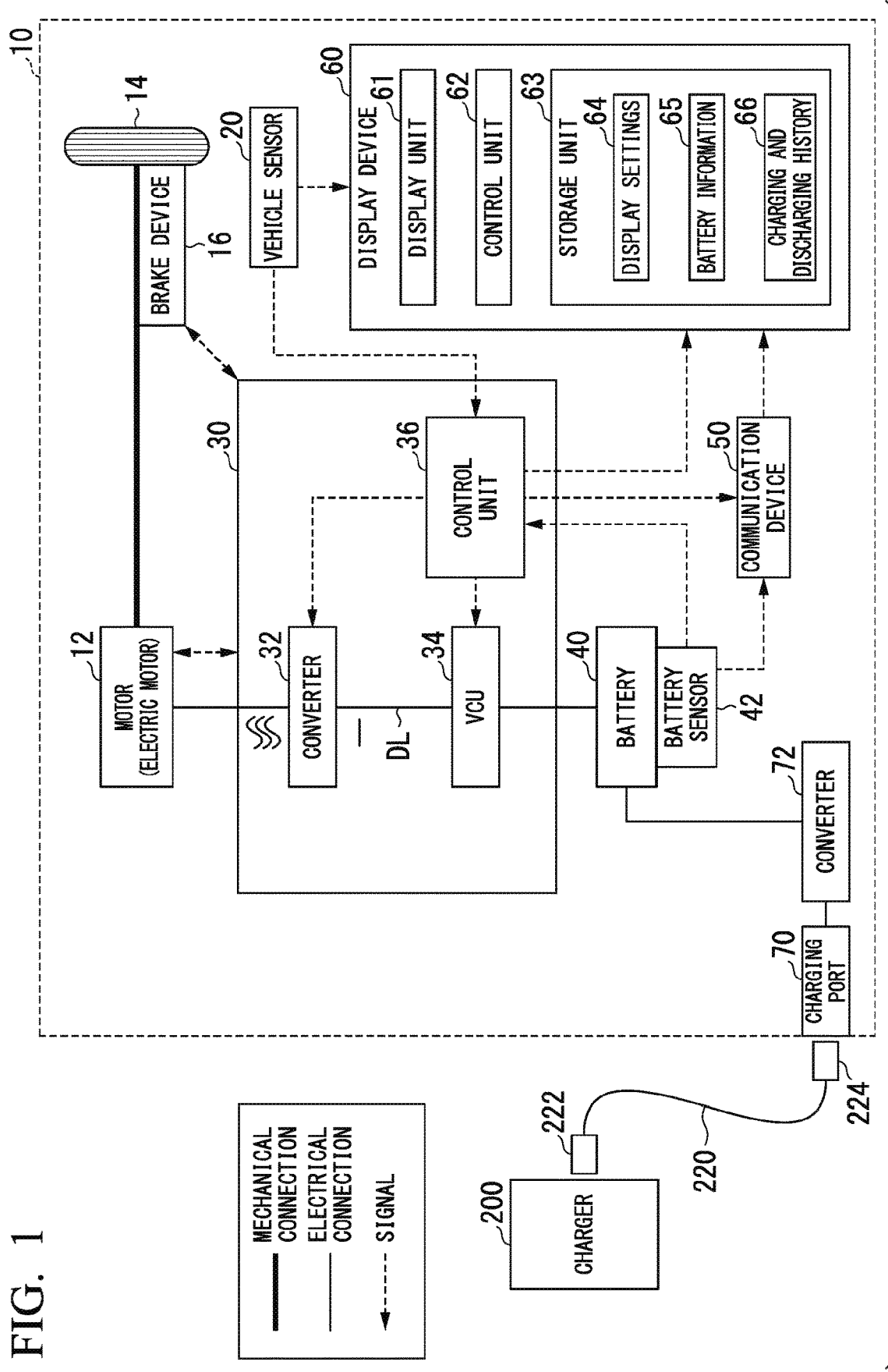
FIG. 1 is a diagram which shows an example of a configuration of a vehicle including a display device according to an embodiment.

FIG. 1 is a diagram which shows an example of a configuration of a vehicle 10 including a display device 60 according to an embodiment. As shown in FIG. 1, the vehicle 10 includes, for example, a motor 12, a drive wheel 14, a brake device 16, a vehicle sensor 20, a power control unit (PCU) 30, a battery 40, a battery sensor 42 such as a voltage sensor, a current sensor, and a temperature sensor, a communication device 50, a display device 60, a charging port 70, and a converter 72.

The motor 12 is, for example, a three-phase alternate current motor. A rotor of the motor 12 is connected to the drive wheel 14. The motor 12 outputs power to the drive wheel 14 using supplied electric power. In addition, the motor 12 generates electric power using a kinetic energy of a vehicle at the time of deceleration of the vehicle.

The brake device 16 includes, for example, a brake caliper, a cylinder that transmits a hydraulic pressure to the brake caliper, and an electric motor that generates hydraulic pressure in the cylinder. The brake device 16 may include, as a backup, a mechanism for transmitting the hydraulic pressure generated by an operation of a brake pedal to the cylinder via the master cylinder. Note that the brake device 16 is not limited to the configuration described above, and may also be an electronically controlled hydraulic brake device that transmits the hydraulic pressure of the master cylinder to the cylinder.

The vehicle sensor 20 includes an accelerator opening sensor, a vehicle speed sensor, and a brake depression amount sensor. The accelerator opening sensor is attached to an accelerator pedal. The accelerator opening sensor detects an operation amount of the accelerator pedal. The detected operation amount of the accelerator pedal is output to the control unit 36 as an accelerator opening. The vehicle speed sensor includes, for example, a wheel speed sensor attached to each wheel and a speed calculator. The vehicle speed sensor derives a speed (a vehicle speed) of a vehicle by combining wheel speeds detected by the wheel speed sensor, and outputs the derived vehicle speed to the control unit 36. The brake depression amount sensor is attached to the brake pedal. The brake depression amount sensor detects an amount of operation of the brake pedal, and outputs the detected amount of operation of the brake pedal to the control unit 36 as a brake depression amount.

The PCU 30 includes, for example, a converter 32, a voltage control unit (VCU) 34, and a control unit 36. Note that configuration of these components in one unit by setting them as the PCU 34 is merely an example, and these components may also be disposed in a distributed manner.

The converter 32 is, for example, an AC to DC converter. A DC side terminal of the converter 32 is connected to a direct current link DL. The battery 40 is connected to the direct current link DL via the VCU 34. The converter 32 converts an alternate current generated by the motor 12 into a direct current, and outputs the converted direct current to the direct current link DL.

The VCU 34 is, for example, a DC to DC converter. The VCU 34 boosts the electric power supplied from the battery 40, and outputs the boosted electric power to the direct current link DL.

The control unit 36 includes, for example, a motor control unit, a brake control unit, and a battery and VCU control unit. The motor control unit, the brake control unit, and the battery and VCU control unit may be replaced by separate control devices, for example, control devices such as a motor ECU, a brake ECU, and a battery ECU.

A motor control unit of the control unit 36 controls the motor 12 on the basis of an output of the vehicle sensor 20. A brake control unit of the control unit 36 controls the brake device 16 on the basis of the output of the vehicle sensor 20. A battery and VCU control unit of the control unit 36 calculates a state of charge (SOC; hereinafter referred to as a "battery charging rate") of the battery 40 on the basis of an output of the battery sensor 42 attached to the battery 40, and outputs the calculated SOC to the VCU 34 and the display device 60. The control unit 36 outputs information on a vehicle speed output by the vehicle sensor 20 to the display device 60. The VCU 34 raises a voltage of a direct current link DL according to an instruction from the battery and VCU control.

The battery 40 is, for example, a secondary battery such as a lithium ion battery. The battery 40 stores electric power introduced from a charger 200 outside the vehicle 10 and discharges it for the traveling of the vehicle 10. The battery sensor 42 includes, for example, a current sensor, a voltage sensor, and a temperature sensor. The battery sensor 42 detects, for example, a current value, a voltage value, and a temperature of the battery 40. The battery sensor 42 outputs the detected current value, voltage value, temperature, and the like to the control unit 36.

The control unit 36 estimates the degree of deterioration of the battery 40 and further learns a deterioration state of the battery 40. For example, the control unit 36 calculates a current full charge capacity of the battery 40 (hereinafter, referred to as a "current maximum capacity"). A learning unit 125 calculates a maximum capacity ratio (deterioration state) of a current maximum capacity to an initial maximum capacity on the basis of the current maximum capacity and the initial maximum capacity. The initial maximum capacity is a full charge capacity of the battery 40 at the time of shipment.

The control unit 36 performs statistical processing such as clustering processing on calculation results such as the full charge capacity, $\Delta SOC$, a charging and discharging electric power, and the maximum capacity ratio. As a result, the control unit 36 can learn the deterioration state of the battery 40. The control unit 36 may also derive the degree of deterioration of the battery 40 based on a value obtained by dividing an integrated value ($\Delta I[Ah]$) of the charging current of the battery 40 between a first time point and a second time point that is different from the first time point by an elapse of a predetermined time thereafter by a difference ($\Delta SOC$ [%]) between a first charging rate of the battery 40 and a second charging rate of the battery 40.

The control unit 36 outputs a result of the calculation to the display device 60. Further, the control unit 36 may calculate the frequency of use of the battery 40 and output it to the display device. The frequency of use may be, for example, a degree of operation (boarding frequency) of the vehicle 10, and may also indicate a frequency of charging or discharging of the battery 40.

The communication device 50 includes a wireless module for connecting a cellular network and a Wi-Fi network.

The display device 60 includes, for example, a display unit 61, a control unit 62, and a storage unit 63. The display unit 61 and the control unit 62 are realized, for example, by a hardware processor such as a central processing unit (CPU) executing a program (software). Some or all of these components may be realized by hardware (a circuit unit; including circuitry) such as a large scale integration (LSI), an application specific integrated circuit (ASIC), a field-programmable gate array (FPGA), and a graphics processing unit (GPU), and may also be realized by cooperation of software and hardware. The program may be stored in a storage device (a non-transitory storage medium) such as a hard disk drive (HDD) or a flash memory in advance, and may be stored in a detachable storage medium (a non-transitory storage medium) such as a DVD or a CD-ROM and installed by the storage medium being mounted on a drive device.

The display unit 61 displays information according to a control of the control unit 62. The control unit 62 causes the display unit 61 to display information based on electric power consumption of the battery 40. The information based on electric power consumption of the battery 40 may be information other than a continuously drivable distance of the vehicle 10, for example, information such as the deterioration state of the battery 40.

The control unit 62 determines whether a sensing result of the battery sensor 42 is normal, and changes a content to be displayed on the display unit 61 according to a result of the determination.

The storage unit 63 is realized by, for example, an HDD, a flash memory, an EEPROM, a random access memory (RAM), or the like. The storage unit 63 stores, for example, information such as display settings 64, battery information 65, and charging and discharging history 66.

The charging port 70 is provided toward the outside of a vehicle body of the vehicle 10. The charging port 70 is connected to the charger 200 via the charging cable 220. The charging cable 220 includes a first plug 222 and a second plug 224. The first plug 222 is connected to the charger 200. The second plug 224 is connected to the charging port 70. Electricity supplied from the charger 200 is supplied to the charging port 70 via the charging cable 220.

In addition, the charging cable 220 includes a signal cable attached to a power cable. The signal cable mediates communication between the vehicle 10 and the charger 200. Therefore, each of the first plug 222 and the second plug 224 is provided with an electric power connector for connecting a power cable and a signal connector for connecting a signal cable.

The converter 72 is provided between the charging port 70 and the battery 40. The converter 72 converts a current introduced from the charger 200 via the charging port 70, for example, an alternate current, into a current for supplying to the battery 40, for example, a direct current. The converter 72 outputs the converted direct current to the battery 40.

[Anthropomorphic Character]

An image of an anthropomorphic character (hereinafter, a character image) displayed on the display unit 61 is, for example, an image imitating a person, and may include a facial image whose facial expression and face direction are recognizable by at least a viewer (a user). For example, in the character image, parts simulating eyes and a nose are represented in a face area, and the facial expression and the face direction may be recognized on the basis of positions of the parts in the face area. In addition, the character image may be an image that is three-dimensionally sensed by the viewer and includes a head image in a three-dimensional space to recognize the face direction of a character. In the character image, an operation, a behavior, a posture, and the like of the character are recognized, and the character image may also include an image of a main body (a torso or limbs). In addition, the character image may be an animation image.

The character image is one of components included in an image set that includes at least two or more images. The control unit 62 selects an image to be displayed on the display unit 61 from an image included in the image set according to the use status (for example, the degree of deterioration, the charging rate, the frequency of use, and the like) of the battery 40, and causes the image to be displayed. Details of processing by the control unit 62 will be described below.

As the character image, a fixed character image may be set for each vehicle type of the vehicle 10, a fixed character image may be set for each battery 40, or the image set of the image of the character selected by the user by himself may be acquired via the communication device 50 and selected.

[Display Unit]

Figure 2:
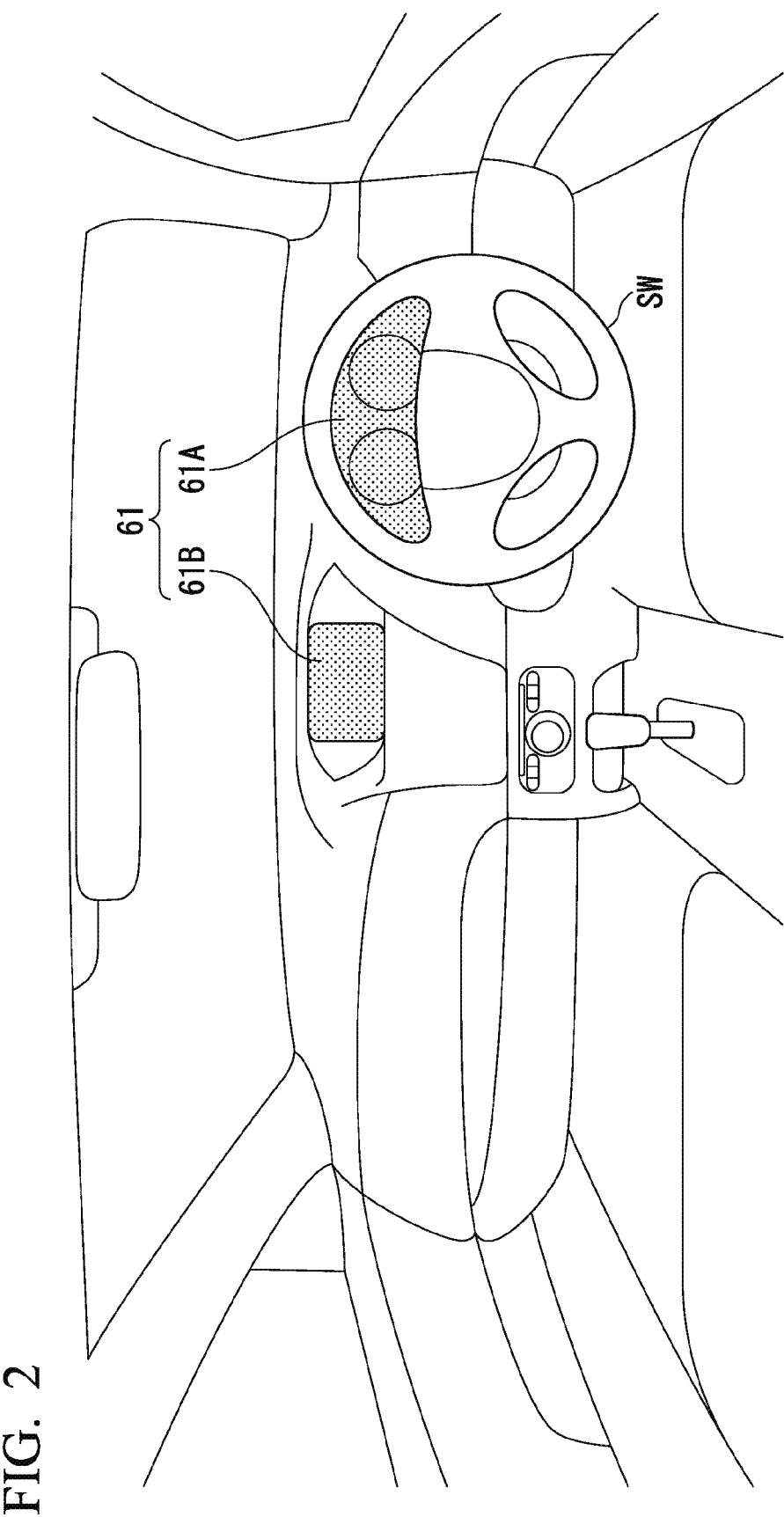
FIG. 2 is a diagram showing a display unit.

FIG. 2 is a diagram showing the display unit 61. The display unit 61 includes, for example, a first display unit 61A and a second display unit 61B. The first display unit 61A is a display unit included in a meter box that can be visually recognized by a user sitting in a driver's seat provided with a steering wheel SW. The second display unit 61B is a display unit that can be visually recognized not only by the user sitting in the driver's seat but also by a user sitting in a seat other than the driver's seat. Note that the second display unit 61B may also be a display unit included in a human machine interface (HMI) of another in-vehicle device (for example, a navigation device). The same image may be displayed on the first display unit 61A and the second display unit 61B, and may also be displayed on only one of them.

[Display Setting]

FIG. 3 is a diagram which shows an example of information stored in the display settings 64. The display settings 64 are information on settings for, for example, a case in which an anthropomorphic character is displayed and a case in which an anthropomorphic character is not displayed. When it is determined that the sensing result of the battery sensor 42 is normal, the control unit 62 causes, for example, the display unit 61 to display an image associated with a time of the normal state. When it is determined that the sensing result of the battery sensor 42 is in a warning state, the control unit 62 causes the display unit 61 to display an image (for example, display an image imitating the battery in yellow) associated with a time of the warning state. When it is determined that the sensing result of the battery sensor 42 is in an abnormal state, the control unit 62 causes the display unit 61 to display an image (for example, display an image imitating the battery in red) associated with a time of the abnormal state. The control unit 62 performs the display in a mode conforming to a standard (such as an international standard) when the sensing result corresponds to the warning state and the abnormal state.

[Battery Information]

FIG. 4 is a diagram which shows an example of information stored in the battery information 65. The battery information 65 stores, for example, a product name (a model number) of the battery 40, a serial number, whether to correspond to the display of an anthropomorphic character, a character image that is displayed as standard when corresponding to the display of an anthropomorphic character, an image of an anthropomorphic character that can be displayed, and information such as configuration information of the image set.

The control unit 62 may determine whether the battery 40 is a battery that satisfies a predetermined condition (for example, a genuine battery or a battery recommended by a vehicle manufacturer) by referring to the battery information 65, and display the image of an anthropomorphic character in accordance with a result of the determination.

[Charging and Discharging History]

FIG. 5 is a diagram which shows an example of information stored in charging and discharging history 66. The charging and discharging history 66 stores information such as a measurement time by the battery sensor 42, a charging rate of the battery 40, and the charging and discharging current.

The control unit 62 displays the image of an anthropomorphic character based on information on the use status of the battery 40 by referring to the charging and discharging history 66.

[Display Control Unit]

FIG. 6 is a diagram which shows an example of a configuration of the control unit 62. The control unit 62 includes, for example, an acquisition unit 62A, a display image determination unit 62B, and an output unit 62C.

The acquisition unit 62A acquires the output result of the control unit 36, the sensing result of the battery sensor 42, and the information stored in the storage unit 63, and outputs them to the display image determination unit 62B.

In addition, the acquisition unit 62A may evaluate a degree of deterioration, a frequency of use, or the like of the battery 40 by itself on the basis of the sensing result of the battery sensor 42, and store a result of the evaluation in the storage unit 63.

The display image determination unit 62B determines an image according to the use status of the battery 40 on the basis of information output by the acquisition unit 62A, and determines an image to be displayed on the display unit 61. The display image determination unit 62B determines whether to display an image of an anthropomorphic character on the display unit 61 on the basis of the sensing result of the battery sensor 42. The display image determination unit 62B determines which of the images stored in the storage unit 63 to display when it is determined to display the image of an anthropomorphic character, and outputs the image that is determined to display to the output unit 62C.

The output unit 62C causes the display unit 61 to display the image on the basis of a result of the determination output by the display image determination unit 62B. A combination of the display image determination unit 62B and the output unit 62C is an example of a "display control unit."

[Display Example of Degree of Deterioration]

The control unit 62 causes, for example, the display unit 61 to display an image in which the degree of deterioration of the battery 40 is expressed using an age of an anthropomorphic character. FIG. 7 is a diagram which shows an example of a rule for determining an image indicating the degree of deterioration of the battery 40 by the display image determination unit 62B.

For example, when an image set formed of two images of a young character image and an old character image (hereinafter, may be referred to as an image set of an "anthropomorphic display 1") is displayed on the display unit 61, the display image determination unit 62B determines to display the young character image in the image set of an "anthropomorphic display 1" when the degree of deterioration of the battery 40 is low. In addition, the display image determination unit 62B determines to display the old character image in the image set of an "anthropomorphic display 1" when the degree of deterioration of the battery 40 is high.

In addition, the display image determination unit 62B may display a suitable image in the image set that can express multiple stages of age such as infancy, childhood, boyhood, youth, middle age, late middle age, and old age (hereinafter, may be referred to as an image set of an "anthropomorphic display 2") on the display unit 61.

As described above, the display of the character image is changed in accordance with the degree of battery deterioration of the battery 40, and thereby the user can notice in advance in which state the degree of deterioration of the battery is. In addition, when the user has recognized that the age of an anthropomorphic character to be displayed on the display unit 61 increases, it can be predicted that there will be an increasing possibility that an image indicating that the battery 40 is in the warning state or the abnormal state will be displayed.

FIG. 8 is a diagram which shows an example of the image set of an "anthropomorphic display 2." For example, if the battery 40 is new, the control unit 62 displays an image of older characters, which are an image of a character image IM1 imitating a child, and displays a character image IM2, a character image IM3, a character image IM4, a character image IM5, and a character image IM6, in an order of gradually increasing age as the deterioration of the battery 40 progresses. When the deterioration of the battery 40 progresses and a voltage measurement value that is the sensing result of the battery sensor 42 is close to a warning range (an end of deterioration), when it is a time to urge the user to consider maintenance of the battery 40, when the user is urged that a replacement time is near, or the like, the control unit 62 displays an image of a character image IM7 imitating old age.

[Display Example of Charging Rate]

Figures 9, 10:
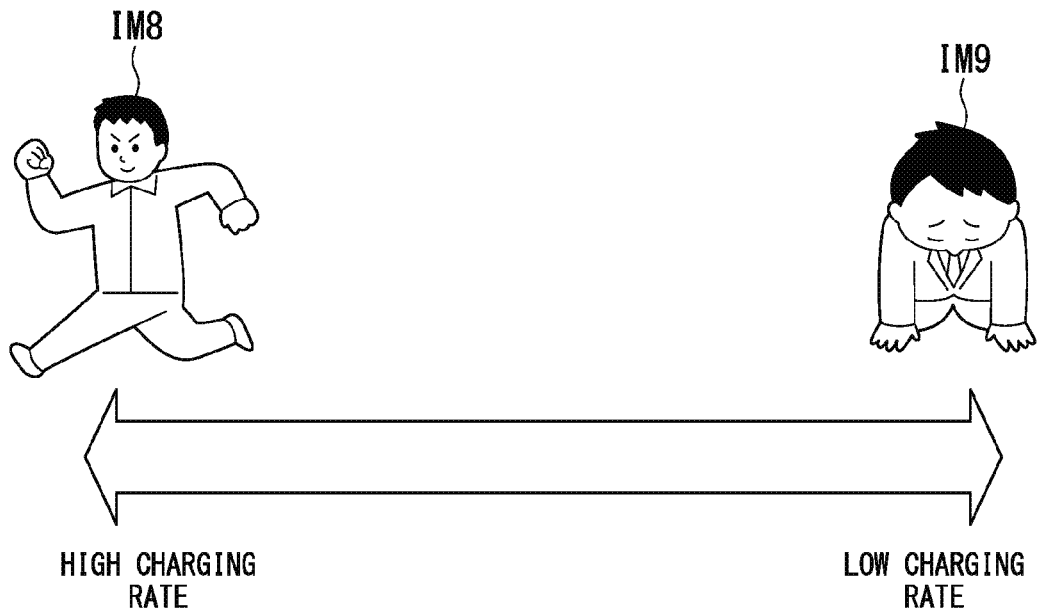
FIG. 9 is a diagram which shows an example of a rule for determining an image indicating a charging rate of the battery by the display image determination unit.
FIG. 10 is a diagram which shows an example of determining the image indicating a charging rate of the battery by the display image determination unit.

In addition, the control unit 62 causes, for example, the display unit 61 to display an image in which the charging rate of the battery 40 is expressed by an emotion of a character image. FIG. 9 is a diagram which shows an example of a rule for determining an image indicating the charging rate of the battery 40 by the display image determination unit 62B.

The control unit 62 causes the display unit 61 to display a character image that looks satisfied, for example, when the charging rate of the battery 40 is equal to or more than a predetermined value. In addition, the control unit 62 causes the display unit 61 to display an character image that looks dissatisfied when the charging rate of the battery 40 is less than the predetermined threshold value.

Figures 11, 12:
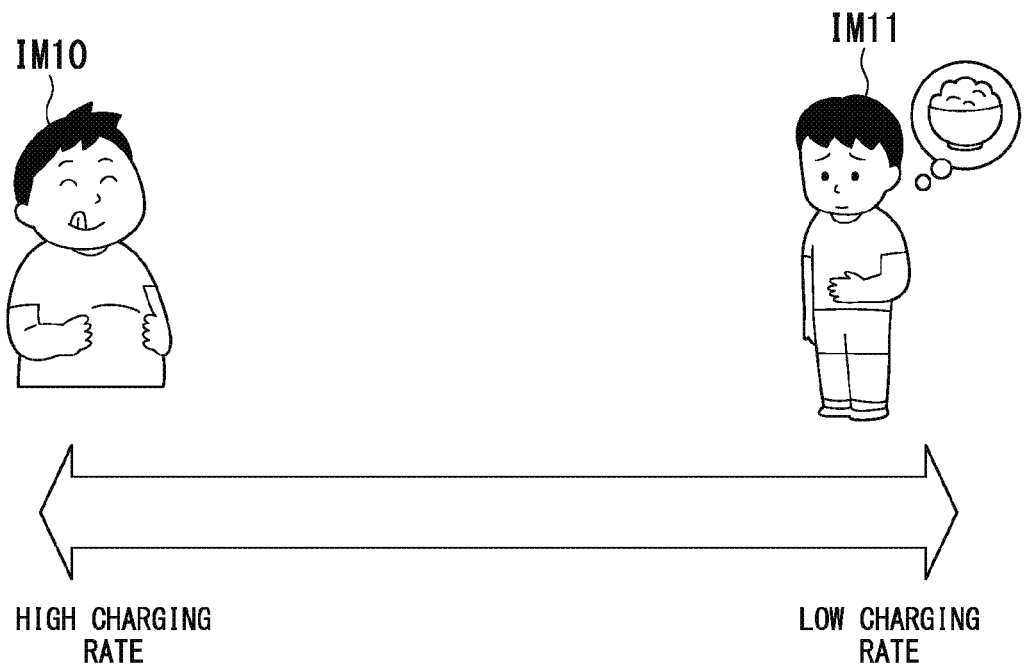
FIG. 11 is a diagram which shows an example of determining the image indicating a charging rate of the battery by the display image determination unit.
FIG. 12 is a diagram which shows an example of the rule for determining an image indicating a frequency of use of the battery by the display image determination unit.

FIGS. 10 and 11 are diagrams which show an example of determining the image indicating the charging rate of the battery 40 by the display image determination unit 62B.

The character image that looks satisfied is, for example, an image that has expressed a positive feeling, such as a facial expression that looks pleasant, a look that looks fine, a smiling face, and a facial expression with bright eyes. In addition, the character image associated with being full may also be included in the character image that looks satisfied.

In addition, the character image that looks dissatisfied is, for example, an image that has expressed a negative feeling, such as a facial expression that looks unhappy, a facial expression that looks unpleasant, a look that looks not in a perfect physical condition, and a crying face.

Moreover, the character image associated with being hungry may also be included in the character image that looks dissatisfied.

For example, as shown in FIG. 10, the display image determination unit 62B determines to display a character image IM8 that looks satisfied when the charging rate of the battery 40 is equal to or more than a predetermined value, and to display a character image IM9 that looks dissatisfied when the charging rate of the battery 40 is less than the predetermined value.

In addition, for example, as shown in FIG. 11, the display image determination unit 62B determines to display a character image IM10 associated with being full when the charging rate of the battery 40 is equal to or more than a predetermined value, and to display a character image IM11 associated with being hungry when the charging rate of the battery 40 is less than the predetermined value.

Note that the control unit 62 may display the degree of deterioration and the charging rate of the battery 40 at the same time using the character images. In this case, the control unit 62 further expresses the charging rate using a character image representing an age that expresses the degree of deterioration. For example, when the battery 40 is new and the charging rate is low, the display image determination unit 62B determines to display an image character of a dissatisfied infant on the display unit 61.

[Display Example of Frequency of Use]

In addition, the control unit 62 expresses, for example, the frequency of use of the battery 40 using a character image and causes the display unit 61 to display it. FIG. 12 is a diagram which shows an example of the rule for determining an image indicating the frequency of use of the battery 40 by the display image determination unit 62B.

The display image determination unit 62B causes, for example, the display unit 61 to display a character image that looks happy when the frequency of use is suitable. In addition, the display image determination unit 62B causes the display unit 61 to display a character image that looks tired when the frequency of use is excessive. Moreover, the display image determination unit 62B causes the display unit 61 to display a character image that looks lonely when the frequency of use is too low.

FIG. 13 is a diagram which shows an example of determining the image indicating the frequency of use of the battery 40 by the display image determination unit 62B.

For example, as shown in FIG. 13, the display image determination unit 62B causes the display unit 61 to display a character image IM13 that looks happy when the use of frequency is suitable. In addition, the display image determination unit 62B causes the display unit 61 to display a character image IM14 that looks tired when the frequency of use is excessive. Moreover, the display image determination unit 62B causes the display unit 61 to display a character image IM12 that looks lonely when the frequency of use is too low.

Note that the character image IM13 that looks happy may be the same image as a standard character image displayed in normal times (for example, when the charging rate is equal to or more than a predetermined value, or the like).

[Display Example of Deterioration Evaluation]

In addition, the control unit 62 causes the display unit 61 to display a result of a deterioration evaluation of the battery 40 in an expression of a character image.

A deterioration evaluation is, for example, an evaluation of the use status of the battery 40 in a predetermined period (for example, one [day], one [week], or the like between the user's getting on and off a vehicle). For example, the deterioration evaluation is evaluated as "high" when the battery 40 is used in a manner that promotes the deterioration (cuts a life of the battery 40), and the deterioration evaluation is evaluated as "low" when the battery 40 is used in a manner that curbs the deterioration (extends the life of the battery 40). For the deterioration evaluation, the sensing result of the battery sensor 42 may be used as it is, and processing of deriving an evaluation may be performed by the acquisition unit 62A.

FIG. 14 is a diagram which shows an example of a rule for determining an image indicating a progress in a deterioration state of the battery 40 by the display image determination unit 62B. For example, the display image determination unit 62B causes the display unit 61 to display the character image representing an emotion of anger when it is determined that deterioration of the battery 40 is promoted, and causes the display unit 61 to display the character image representing an emotion of joy when it is determined that the deterioration of the battery 40 is curbed.

FIG. 15 is a diagram which shows an example of determining an image indicating a result of the deterioration evaluation of the battery 40 by the display image determination unit 62B.

For example, as shown in FIG. 15, the display image determination unit 62B causes the display unit 61 to display a character image IM15 representing the emotion of anger when a result of the deterioration evaluation is "high." In addition, the display image determination unit 62B causes the display unit 61 to display a character image IM16 representing the emotion of joy when the result of the deterioration evaluation is "low."

Note that the character image IM16 representing the emotion of joy may be the same image as the standard character image displayed in normal times (for example, when the charging rate is equal to or more than a predetermined value, or the like).

Note that a character image indicating the result of the deterioration evaluation may be always displayed during a user's boarding a vehicle, and may be displayed for a predetermined time at a specific timing. In this case, for example, the control unit 62 may cause the display unit 61 to display the character image indicating the result of the deterioration evaluation during a temporary stop of the vehicle 10, or cause the display unit 61 to display the character image indicating the result of the deterioration evaluation for about one [min] at a start timing of the vehicle 10, a parking or stop timing of the vehicle 10, and the like.

Moreover, the character image indicating the result of the deterioration evaluation may be expressed by the same character as a character image indicating other elements in the use status of the battery 40, and may also be expressed by different characters (for example, the character image indicating the result of the deterioration evaluation is set as a male character and the character image indicating other elements is set as a female character).

[Character Image According to Use Status]

Figure 16:
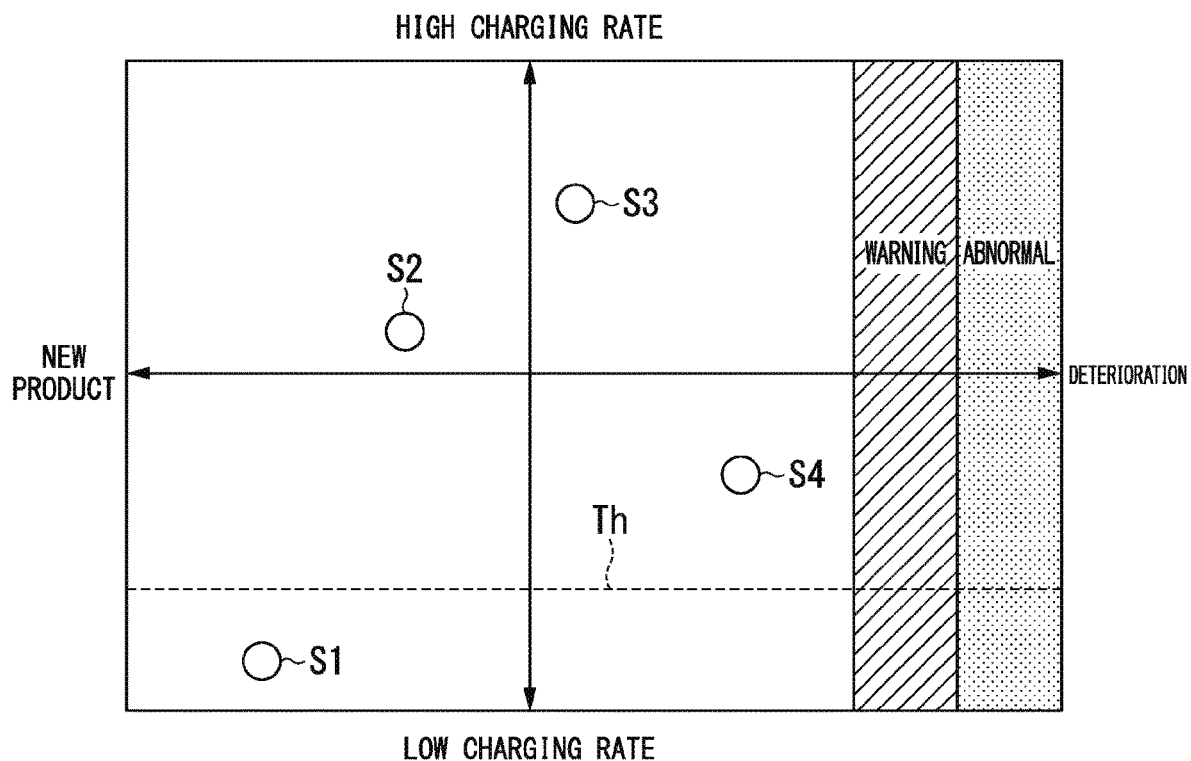
FIG. 16 is a diagram showing a display example of a character image according to a use state of the battery.
Figure 17:
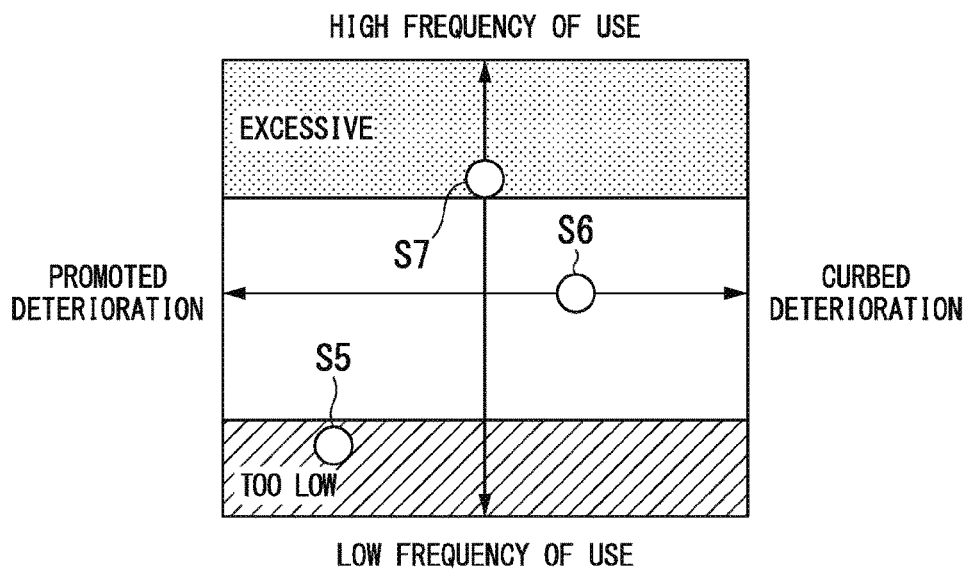
FIG. 17 is a diagram showing a display example of the character image according to a use state of the battery.

FIGS. 16 and 17 are diagrams showing a display example of a character image according to a use state of the battery 40.

For example, as shown in FIG. 16, in a state in which the battery 40 is new and has a low charging rate less than a predetermined value Th (hereinafter, a state S1), and a state in which the battery is slightly new and the charging rate is slightly high (hereinafter, a state S2), the display image determination unit 62B determines to display different character images to express that "the charging rate is lower" in the state S1, which is information with higher importance.

In this case, the display image determination unit 62B displays, for example, a character image that looks young and hungry as an image indicating the state S1. Note that the ages of the character images displayed in the state S1 and the state S2 may be the same, or it may be displayed that the age in the state S2 is higher.

Moreover, in a state in which the battery 40 is in a medium use stage (a state in which a use history is about a half of product life), and has a high charging rate less than the predetermined value Th (hereinafter, a state S3), and a state in which the charging rate of the battery 40 is slightly low and the deterioration of the battery 40 has progressed (a state corresponding to the latter half of the product life) and which is a period of time in which the user is caused to start considering maintenance or replacement of the battery 40 (hereinafter, a state S4), the display image determination unit 62B determines to display different character images to express that "the degree of deterioration is further progressing" in the state S4, which is information with higher importance.

In this case, the display image determination unit 62B displays, for example, the old character image as an image indicating the state S4. Note that, the display unit 61 may be caused to display a character image that looks satisfied because both of the charging rates of character images displayed in the state S3 and the state S4 are equal to or more than the predetermined value Th, and the display unit 61 may be caused to display a character image that looks more satisfied than the character image indicating the state S4 to express that the charging rate in the state S3 is higher. In this case, for example, the display image determination unit 62B determines to causes the display unit 61 to display a character image of a youth that looks more satisfied as the character image indicating the state S3, and determines to cause the display unit 61 to display an old character image that looks satisfied as the character image indicating the state S4.

In addition, as shown in FIG. 17, the display image determination unit 62B determines to display different character images on the display unit 61 in a state in which it is evaluated that the frequency of use of the battery 40 is insufficient and the deterioration is promoted (hereinafter, a state S5), a state in which it is evaluated that the frequency of use of the battery 40 is suitable and the deterioration is curbed (hereinafter, a state S6), and a state in which the frequency of use of the battery 40 is excessive and the deterioration is moderate (the deterioration is neither promoted nor curbed) (hereinafter, a state S7).

In this case, for example, as a character image indicating the state S5, a character image that looks lonely and represents the emotion of anger may also be displayed on the display unit 61, or a character image that looks lonely and a character image representing the emotion of anger may also be alternately displayed on the display unit 61 at intervals of a predetermined time (about 10 seconds).

In addition, for example, as a character image indicating the sate S7, a character image that looks tired may be displayed on the display unit 61. In the state S7, a display of a designated character image that indicates the result of the deterioration evaluation is medium may be performed, and a display of a character image that indicates the result of the deterioration evaluation may also be omitted.

In addition, for example, as a character image indicating the state S6, a character image IM13 that represents the emotion of joy and looks happy may also be displayed on the display unit 61, and a character image representing the emotion of joy and a character image that looks happy may also be alternately displayed on the display unit 61 at intervals of a predetermined time.

Note that the display image determination unit 62B may display a character image having a lower display frequency than usual (a rare character) on the display unit 61 to shows to the user that the state S6 is preferable as the use status of the battery 40.

[Processing Flow]

Figure 18:
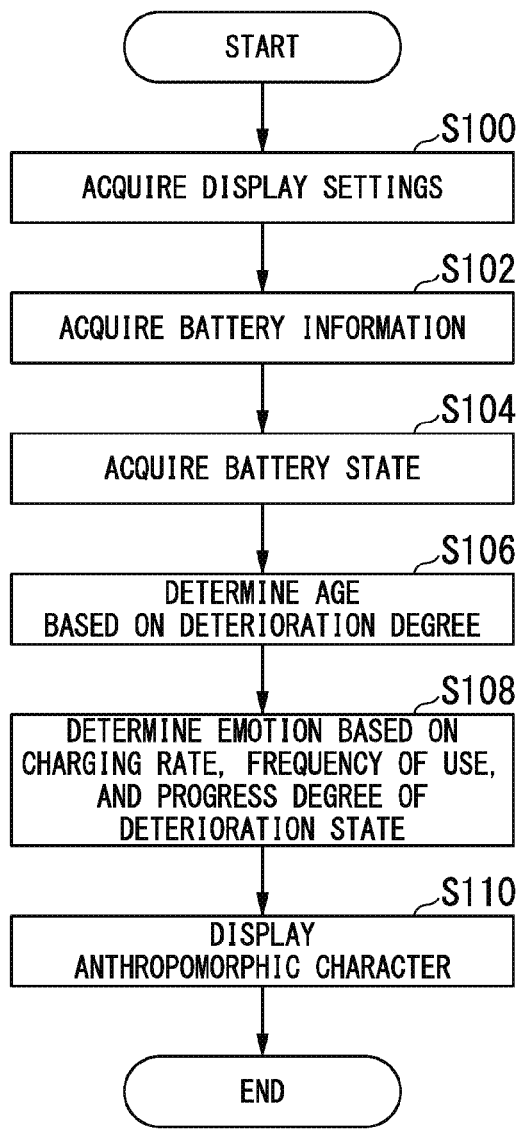
FIG. 18 is a flowchart which shows an example of a flow of image display processing by a display device.

Hereinafter, a flow of display processing by the display device 60 will be described. FIG. 18 is a flowchart which shows an example of a flow of image display processing by the display device 60.

First, the acquisition unit 62A acquires information stored in the display settings 64 of the storage unit 63 (step S100). Furthermore, it acquires battery information 65 of the storage unit 63 (step S102).

Next, the acquisition unit 62A acquires a state of the battery 40 by acquiring a sensing result of the battery sensor 42 (step S104). Note that the acquisition unit 62A may perform deterioration evaluation of the battery on the basis of various types of information acquired in steps S100 to S104.

Next, the display image determination unit 62B determines the age of the image of an anthropomorphic character on the basis of information on the degree of deterioration of the battery 40 among information acquired by the acquisition unit 62A (step S106). Next, the display image determination unit 62B determines which emotion-corresponding anthropomorphic character image to be displayed on the display unit 61 on the basis of information on the charging rate, the frequency of use, and the deterioration state of the battery 40 among the information acquired by the acquisition unit 62A (step S108). Next, the output unit 62C displays the image of an anthropomorphic character determined by the display image determination unit 62B on the display unit 61 (step S110). As described above, a description of processing of this flowchart ends.

As described above, according to the display device 60 of the embodiment, the acquisition unit 62A that acquires information on the use status of the battery 40 storing the electric power for traveling of a vehicle, the display unit 61 that displays the image of an anthropomorphic character, and the display image determination unit 62B determines an image in which a result of the acquisition by the acquisition unit 62A is represented by an anthropomorphic character, and the determined image is output to the display unit 61 by the output unit 62C, and thereby it is possible to display the battery deterioration state of the battery 40 in a manner in which the user can easily and intuitively understand it.

In addition, according to the display device 60 of the embodiment, the display image determination unit 62B determines to cause display unit 61 to display the image in which the charging rate of the battery 40 that is the acquisition result of the acquisition unit 62A is expressed using the emotion of an anthropomorphic character, and thereby the charging rate of the battery 40 can be displayed in a manner in which the user can easily and intuitively understand it.

Moreover, according to the display device 60 of the embodiment, the display image determination unit 62B determines to cause the display unit 61 to display an image in which the frequency of use of the battery 40 that is the acquisition result of the acquisition unit 62A is expressed using the emotion of an anthropomorphic character, and thereby the information on the frequency of use of the battery 40 can be displayed in a manner in which the user can easily and intuitively understand it.

[Modified Example of Display Device]

Note that, an example in which an anthropomorphic character is displayed on the display unit 61 for the user of the vehicle 10 regarding the use status of the battery 40 mounted in the vehicle 10 has been shown in the embodiment described above, but the anthropomorphic character may also be used for the use status of the battery 40 removed from the vehicle 10.

In the following description, differences from the embodiment described above will be mainly described, and points common to the embodiment described above will be omitted. Note that the same constituents as those in the embodiment may be denoted by the same names and the descriptions thereof may be omitted in description of a modified example.

Figure 19:
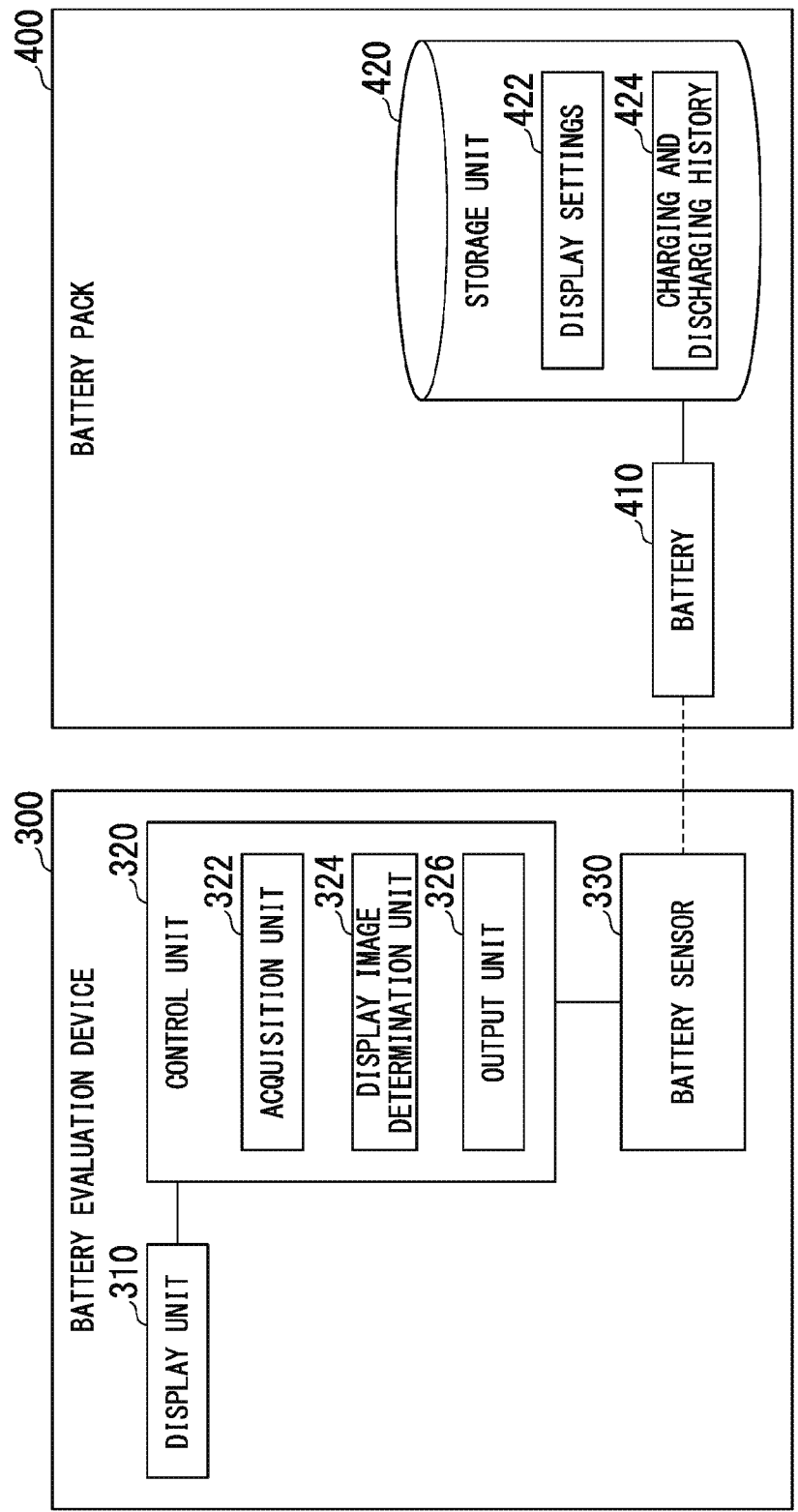
FIG. 19 is a diagram which shows an example of a configuration of a battery evaluation device according to a modified example.

FIG. 19 is a diagram which shows an example of a configuration of the battery evaluation device 300 according to the modified example. The battery evaluation device 300 in the modified example includes, for example, a display unit 310, a control unit 320, and a battery sensor 330. The display unit 310 is associated with the display unit 61 of the embodiment described above. The control unit 320 is associated with the control unit 62 of the embodiment described above. The battery sensor 330 is associated with the battery sensor 42 of the embodiment described above.

The battery evaluation device 300 is used, for example, for a user to acquire information on the use status of a battery pack 400 at the time of a purchase of a new battery pack 400, a purchase of a used battery pack 400, a replacement of the battery pack 400, or the like.

The control unit 320 includes, for example, an acquisition unit 322, a display image determination unit 324, and an output unit 326. The acquisition unit 322 is associated with the acquisition unit 62A of the embodiment described above. The display image determination unit 324 is associated with the display image determination unit 62B of the embodiment described above. The output unit 326 is associated with the output unit 62C of the embodiment described above.

The battery pack 400 includes, for example, a battery 410 and a storage unit 420. The battery 410 is associated with the battery 40 of the embodiment described above.

The storage unit 420 stores, for example, information such as display settings 422 and charging and discharging history 424. The display settings 422 are associated with the display settings 64 of the embodiment described above. The charging and discharging history 424 is associated with the charging and discharging history 66 of the embodiment described above.

The battery evaluation device 300 is connected to an output terminal of the battery pack 400 using a cable (not shown) or the like. The battery sensor 330 is connected to the battery 410 and the storage unit 420 of the battery pack 400 to sense the use status of the battery 410 or to acquire the information indicating the use status of the battery 410 from the storage unit 420.

The battery evaluation device 300 displays the image of an anthropomorphic character indicating the use status of the battery 410 on the display unit 310 on the basis of the sensing result and various information obtained from the battery pack 400. As a result, the user can understand information such as a progress of the deterioration state of the battery, which may be difficult to understand by simply acquiring information such as a voltage and a current of the battery 410, through an anthropomorphic character that is a form to be easily and intuitively understood.

[Modified Example of Anthropomorphic Character]

In the description described above, an example in which an anthropomorphic character is used when the state of the battery 40 is expressed has been described, but a character may be a motif other than a person (for example, an animal or a plant).

Figure 20:
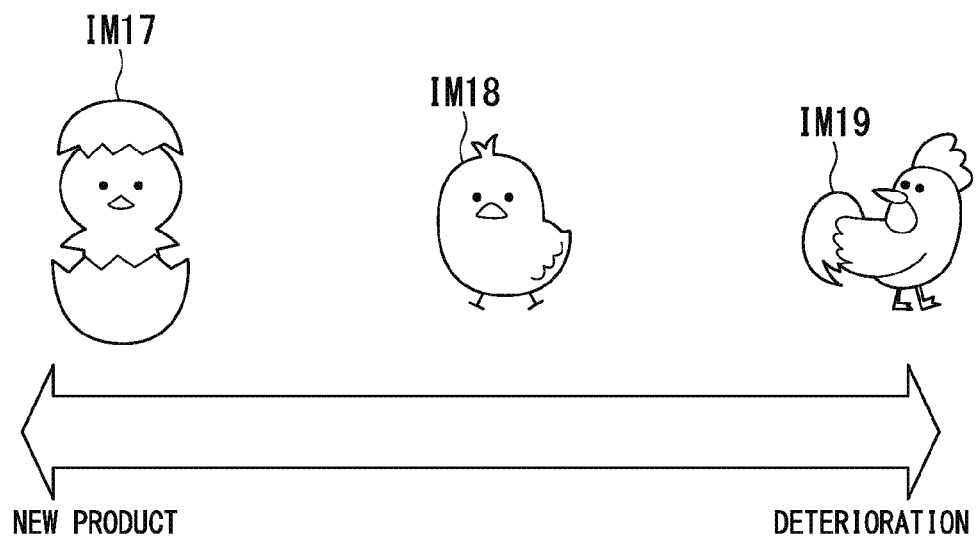
FIG. 20 is a diagram which shows another example of the display settings of the degree of deterioration of the battery.
Figure 21:
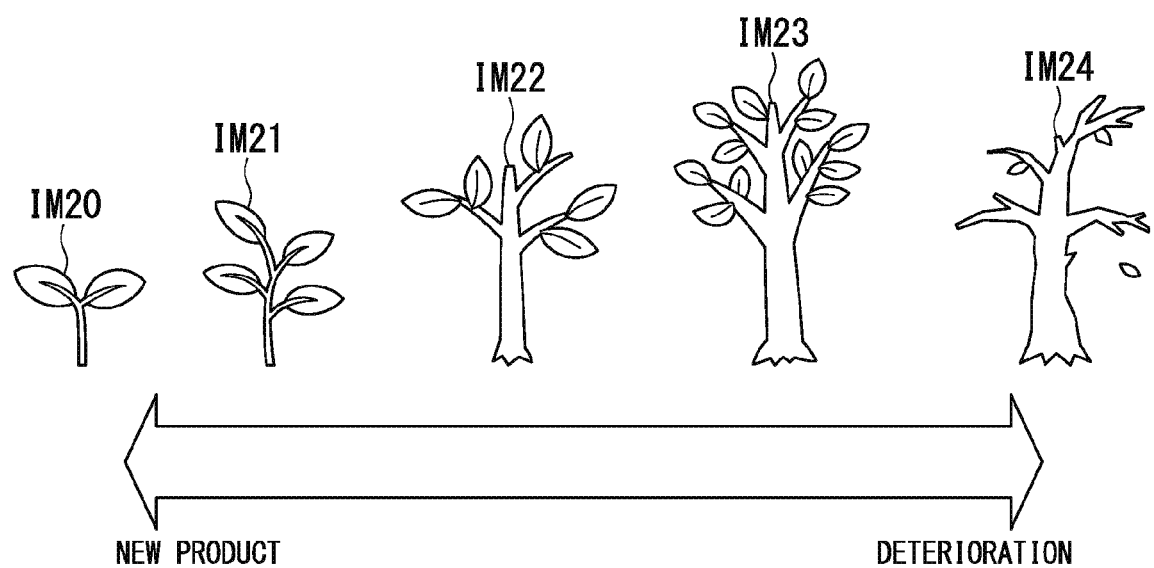
FIG. 21 is a diagram which shows another example of the display settings of the degree of deterioration of the battery.

FIGS. 20 and 21 are diagrams which show another example of the display settings of the degree of deterioration of the battery 40. The display image determination unit 62B (or the display image determination unit 324, the same applies hereinafter) may display the use status of the battery 40 (or the battery 410, the same applies hereinafter) on the display unit 61 (or the display unit 310, the same applies hereinafter) using, for example, an image set of an animal whose appearance changes in a growth from a larva to an adult body, like an image IM17 to an image IM19 shown in FIG. 20, instead of anthropomorphic characters.

In addition, the display image determination unit 62B may also display the use status of the battery 40 on the display unit 61 using, for example, an image set of a plant whose appearance changes greatly in a process of growth and aging from an initial stage such as germination, like an image IM20 to an image IM24 shown in FIG. 21, instead of the anthropomorphic characters.

The embodiment described above can be expressed as follows.

A display device is configured to include a storage device that stores a program, and a hardware processor, in which the hardware processor executes the program stored in the storage device, and thereby acquiring information on a use status of a battery storing electric power for traveling of a vehicle, and displaying an image in which a state of the battery is represented by an anthropomorphic character on a display unit on the basis of the acquisition result.

As described above, the form to implement the present invention has been described using an embodiment, but the present invention is not limited to the embodiment, and various modifications and substitutions may be made in a range not departing from the gist of the present invention.

What is claimed is:

1. A display device comprising:
   a processor; and
   a memory that stores executable instructions that, when executed by the processor, facilitate performance of operations, comprising:
   acquiring information on a use status of a battery that stores electric power for traveling of a vehicle;
   calculating a state of the battery comprising a frequency of use of the battery based on the use status;
   displaying an image in which a state of the battery is represented by an anthropomorphic character on a display unit based on a result of the acquisition; and
   when the state of the battery is the state in which the frequency of use of the battery is suitable and a deterioration is curbed, changing the anthropomorphic character that is displayed on the display unit and displaying a second anthropomorphic character having a lower display frequency than a first anthropomorphic character that is displayed in another state.

2. The display device according to claim 1, wherein the operations further comprise:
   displaying an image in which a degree of deterioration of the battery is expressed using an age of the anthropomorphic character.

3. The display device according to claim 1, wherein the operations further comprise:
   displaying an image in which a charging rate of the battery is expressed using an emotion of the anthropomorphic character.

4. The display device according to claim 1, wherein the operations further comprise:
   displaying an image of the anthropomorphic character that looks satisfied when a charging rate of the battery is equal to or more than a predetermined value; and
   displaying an image of the anthropomorphic character that looks dissatisfied when the charging rate of the battery is less than the predetermined value.

5. The display device according to claim 1, wherein the operations further comprise:
   expressing a frequency of use of the battery using an emotion of an anthropomorphic character to be expressed;
   displaying an image of the anthropomorphic character that looks happy when the frequency of use is suitable;
   displaying an image of the anthropomorphic character that looks tired when the frequency of use is excessive; and
   displaying an image of the anthropomorphic character that looks lonely when the frequency of use is too low.

6. The display device according to claim 1, wherein the operations further comprise:
   expressing a progress of a deterioration state of the battery using an emotion of an anthropomorphic character to be expressed;
   displaying an image of the anthropomorphic character representing an emotion of anger when it is determined that the deterioration of the battery is advanced; and
   displaying an image of the anthropomorphic character representing an emotion of joy when it is determined that the deterioration of the battery is curbed.

7. A display method comprising:
   by a computer, acquiring information on a use status of a battery that stores electric power for traveling of a vehicle;
   by the computer, calculating a state of the battery comprising a frequency of use of the battery based on the use status;
   by the computer, displaying an image in which a state of the battery is represented by an anthropomorphic character on a display unit based on a result of the acquisition; and
   by the computer, when the state of the battery is the state in which the frequency of use of the battery is suitable and a deterioration is curbed, changing the anthropomorphic character that is displayed on the display unit and displaying a second anthropomorphic character having a lower display frequency than a first anthropomorphic character that is displayed in another state.

8. A computer-readable non-transitory storage medium that includes a program causing a computer to:
   acquire information on a use status of a battery that stores electric power for traveling of a vehicle;
   calculate a state of the battery comprising a frequency of use of the battery based on the use status;
   display an image in which a state of the battery is represented by an anthropomorphic character on a display unit based on a result of the acquisition; and
   when the state of the battery is the state in which the frequency of use of the battery is suitable and a deterioration is curbed, change the anthropomorphic character that is displayed on the display unit and display a second anthropomorphic character having a lower display frequency than a first anthropomorphic character that is displayed in another state.

* * * * *